April 5, 1927.  W. M. KUSHNER  1,623,544
ADAPTER FOR VACUUM BOTTLES
Filed May 15, 1925
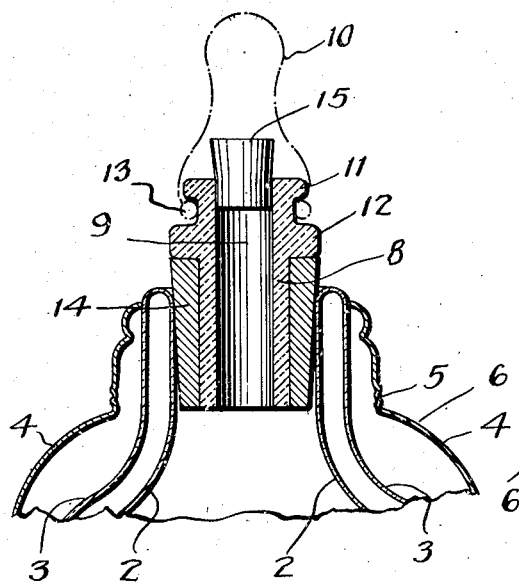
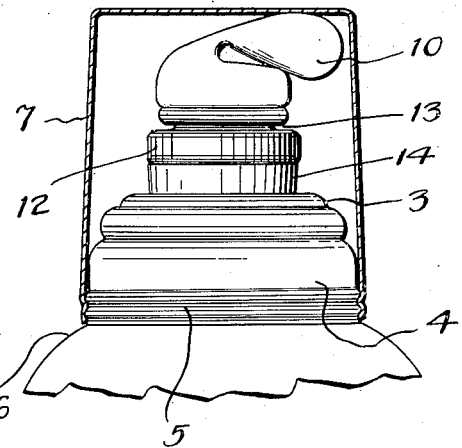
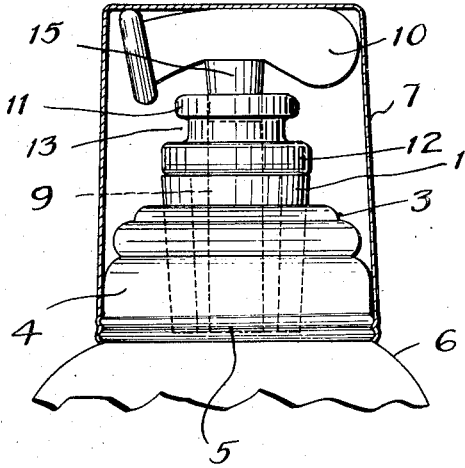
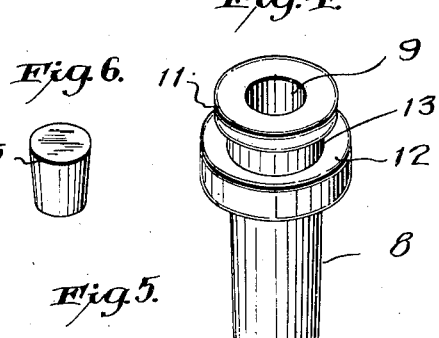
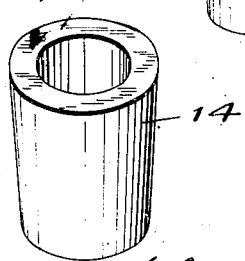
INVENTOR
William M. Kushner
BY
ATTORNEY Patented Apr. 5, 1927.

1,623,544

UNITED STATES PATENT OFFICE.

WILLIAM M. KUSHNER, OF BROOKLYN, NEW YORK.

ADAPTER FOR VACUUM BOTTLES.

Application filed May 15, 1925. Serial No. 30,406.

The invention relates to an attachment for vacuum or thermal bottles, and the object is to provide an inexpensive, sanitary and properly working adapter for converting an ordinary vacuum bottle into a nursing bottle wherein milk can be kept warm and ready for the baby. It is of recognized importance in the feeding of infants that milk be at a proper temperature, and it is likewise important to avoid possible contamination.

My invention provides a means whereby, in any household equipped with a vacuum bottle, the baby's milk can be warmed at a convenient time in a vessel of known cleanliness, and then placed in the vacuum bottle and kept at the proper temperature until feeding time, when it is taken by the baby from the same bottle. The vacuum bottle is also still available for ordinary uses. The object of the invention is to provide a device of this character which shall be inexpensive and both entirely sanitary and entirely satisfactory in operation.

In the accompanying drawings, forming part hereof:

Fig. 1 is a vertical sectional view of the adapter in place on the mouth of a vacuum bottle, the manner in which a nipple is carried by the adapter being indicated in broken lines;

Fig. 2 is a view in elevation of the upper part of the bottle and an adapter, with the cup head of the bottle in section and the nipple lying beneath the head;

Fig. 3 is a view similar to Fig. 2 but showing the nipple on the adapter, the small stopper having been removed;

Fig. 4 is a perspective view of the body of the adapter;

Fig. 5 is a perspective view of the sheath; and

Fig. 6 is a perspective view of the stopper.

The drawing represents the known vacuum bottle, having inner and outer walls 2, 3 separated by the vacuum space, and a metal shell 4 having screw-threads 5 at the top of the breast 6 to receive a cup head 7. The mouth of such a bottle is ordinarily closed by a long thick cork.

My adapter, as preferably constructed, comprises a tubular glass thimble 8 containing an ample smooth bore or passage 9 for the flow of milk to the nipple 10. The upper part of this body or neck is enlarged to form a head adapted to receive the nipple, such head being best constructed with upper and lower enlargements, or beads, 11 and 12, separated by an annular recess 13 in which the base of the nipple is seated, to be retained by the bead 11.

A cork sheath 14, cylindrical on the inside and tapered on the outside to fit the mouth of the vacuum bottle, is fitted frictionally on the tubular part of the body extending below the lower enlargement 12 of the head. This sheath is tight on the body so as to be part of the adapter, but can be removed from the body for sterilizing. The shoulder 12 guards the upper end of the sheath, and the relations are such that this end of the sheath extends above the mouth of the bottle, as seen in Figs. 1 to 3, so both the sheath and the part 12 can be grasped to avoid any possibility of the sheath being left behind when the adapter is taken out.

A small cork stopper 15 fits removably in the upper end of the bore 9 to complete the closure.

In use, the warm milk may be placed in the bottle, the adapter inserted in the mouth, corked with the stopper 15, and the nipple placed in the head of the bottle, as shown in Fig. 2. The bottle may now be put in the baby carriage, and the baby taken for an extended airing, without the necessity of going home to warm its milk. Or the bottle may be carried in this condition when traveling, making it unnecessary to warm the milk in some place away from home. When the bottle is used in this manner, the cork 15 is simply removed from the adapter and the nipple applied thereto, when the infant is to be given its meal.

For use at night, it is most convenient to put the cap 7 on the bottle, with the nipple on the adapter and the cork 15 out, the nipple simply folding over beneath the cap, as shown in Fig. 3. Then when the baby wakes in the night, all that need be done is to unscrew the cap and give the baby the bottle at once. The wear and trouble of the parent getting out of bed, and going to the kitchen to warm the milk, losing time and sleep, and allowing the baby to become started on a crying fit, are entirely avoided.

The several parts of the device are connected frictionally and separably for sterilizing. The breadth of the passage 9 is important for this purpose, and permits free flow when the infant is taking its milk.

While the preferred embodiment of the invention has been described in detail, it will be understood that I do not necessarily limit myself to precise details which may be varied without departing from essentials.

The adapter is so constructed as to be perfectly sanitary, and the parts are all separable for sterilizing.

What I claim as new is:

1. A nursing adapter insertible in the mouth of a vacuum bottle, said adapter comprising a short tubular thimble in the nature of a bottle neck surrounding a broad passage and formed with a head to receive a nipple.

2. A nursing adapter insertible in the mouth of a vacuum bottle, said adapter comprising a short tubular thimble in the nature of a bottle neck surrounding a broad passage and formed with a head to receive a nipple, together with a stopper adapted to be inserted in the outer end of said passage.

3. A nursing adapter insertible in the mouth of a vacuum bottle, said adapter comprising a short tubular thimble in the nature of a bottle neck surrounding a broad passage and formed with a head to receive a nipple, and a removable compressible sheath frictionally fitted on said thimble.

4. A nursing adapter insertible in the mouth of a vacuum bottle, said adapter comprising a short tubular thimble in the nature of a bottle neck surrounding a broad passage and formed with a head to receive a nipple, a removable compressible sheath frictionally fitted on the outside of the thimble, and a removable stopper adapted to be inserted in the interior of the thimble.

WILLIAM M. KUSHNER.